United States Patent [19]

Groenig

[11] 4,325,442
[45] Apr. 20, 1982

[54] FORK LIFT

[76] Inventor: Robert E. Groenig, 201 S. 88th Ave., Yakima, Wash. 98902

[21] Appl. No.: 108,655

[22] Filed: Dec. 31, 1979

[51] Int. Cl.³ .............................................. B62D 11/04
[52] U.S. Cl. .................................. 180/6.48; 187/9 R
[58] Field of Search ............... 187/9 R, 9 E; 180/6.48, 180/333; 137/596.2

[56] References Cited

U.S. PATENT DOCUMENTS

| | | | |
|---|---|---|---|
| 3,307,656 | 3/1967 | Susag | 187/9 E |
| 3,319,816 | 5/1967 | Christenson | 187/9 E |
| 3,323,607 | 6/1967 | Futamata | 180/6.48 |
| 3,774,707 | 11/1973 | Bridwell et al. | 180/6.48 |
| 3,841,423 | 10/1974 | Holtkamp et al. | 180/6.48 |
| 3,876,020 | 4/1975 | Barsby | 180/6.48 |
| 4,022,022 | 5/1977 | Marietta | 180/6.48 |
| 4,201,272 | 5/1980 | Midolo | 180/6.48 |

Primary Examiner—Robert J. Spar
Assistant Examiner—Kenneth Noland

[57] ABSTRACT

A fork lift having two front wheels each driven by a separate hydraulic motor and a caster rear wheel. The hydraulic control controls the motors individually controlling speed, direction and steering the vehicle.

4 Claims, 3 Drawing Figures

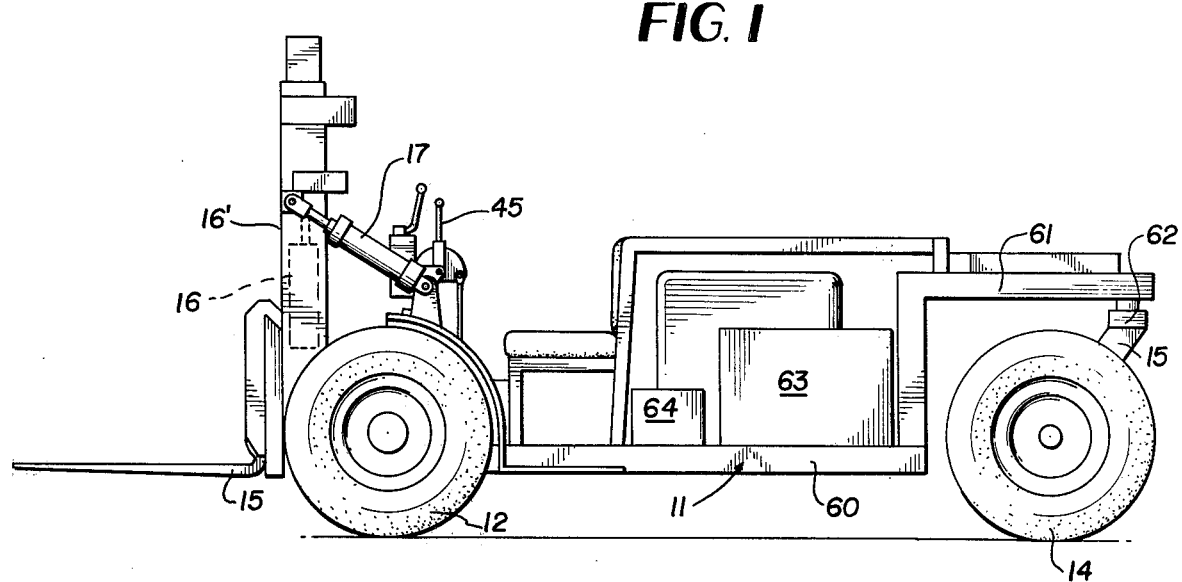
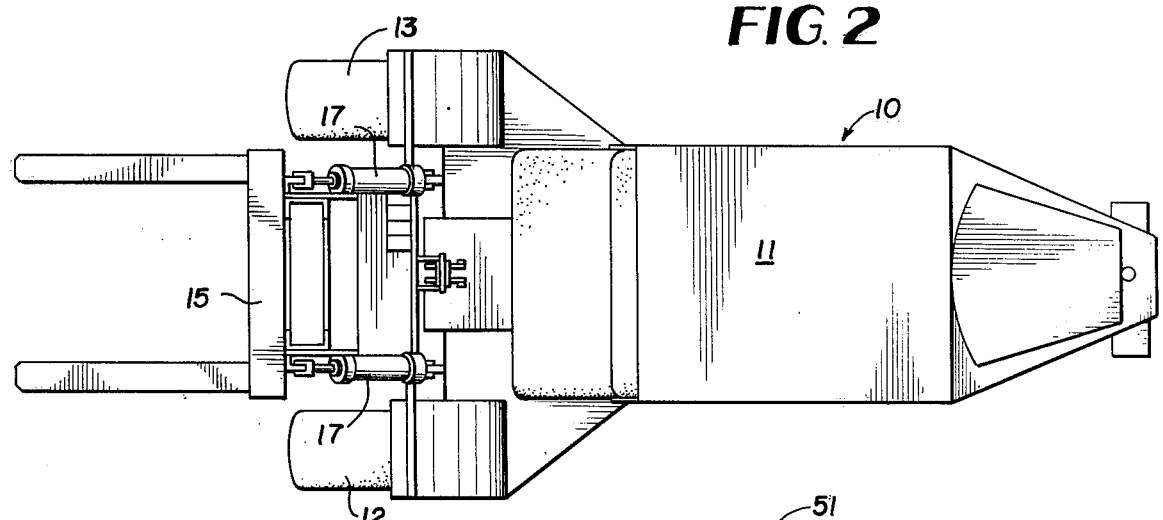
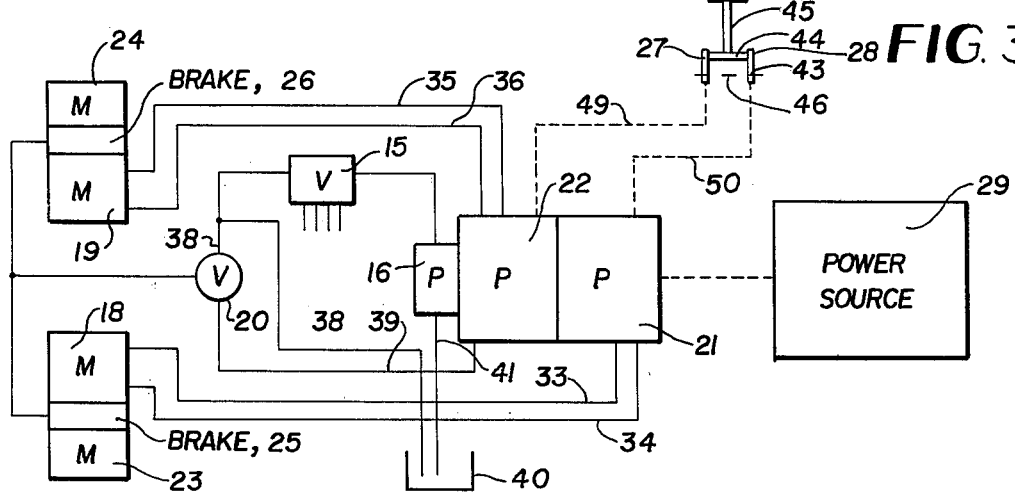

FORK LIFT

OBJECTS OF THE INVENTION

It is an object of the invention to provide an improved fork lift truck.

Another object of the invention is to provide a fork lift truck that is steered by controlling the speed and direction of the wheels individually, Another object of the invention is to provide an improved control for a fork lift truck, Another object of the invention is to provide a fork lift truck that is simple in construction, economical to manufacture and simple and efficient to use.

With the above and other objects in view, the present invention consists of the combination and arrangement of parts hereinafter morefully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a side view of a fork lift truck according to the invention.

FIG. 2 is a top view of the truck shown in FIG. 1.

FIG. 3 is a hydraulic circuit diagram of the drive mechanism of the fork lift truck.

DETAILED DESCRIPTION OF THE DRAWINGS

Now with more particular reference to the drawings, FIGS. 1 and 2 show a fork lift truck indicated generally at 10 having a body 11, front wheels 12 and 13, rear caster wheels 14 and fork 15. The fork is lifted by hydraulic cylinder 16 and mast 16' and tilted forwardly and rearwardly by cylinder 17.

Each of the wheels 12 and 13 are driven by individual hydraulic motors 18 and 19 through to the hubs 23 and 24. Brakes 25 and 26 are connected through valve 20 and lines 37, 38 and 39. Brakes 25 and 26 are connected to wheels 12 and 13 and spring engaged-hydraulic pressure released. Third wheel 14 is supported on the body in the caster arrangement shown.

The first pump 21 is connected to motor 18 which drives the first wheel 12 through torque hubs 23 and second pump 22 is connected to the second motor 19 which drives wheel 13 through torque hub 26 and is connected to the second wheel 13. The first pump 21 supplies fluid under pressure through line 33 or line 34 to the motor 18 for forward or reverse. Pump 22 supplies liquid under pressure through lines 35 and 36 for forward or reverse. Pumps 16, 21 and 22 are driven by gasoline engine 29.

The fluid from the oil tank 40 is directed through line 41 to the pumps and controlled to flow through lines 33, 34, 35 and 36 by valves controlled by links 49 and 50.

The control is made up of the first ring gear sector 27, and second ring gear sector 28 which are pivoted to the fork lift body on axle 43. A sprocket 44 is connected to the shaft of handle 45 which is pivoted about the axle end 46. The ring gear sectors 27 and 28 have links 49 connected to a valve in hydraulic pump 22 and the link 50 connected to a valve 51 which controls the speed of the motor.

By swinging the handle 45 about its axis 46 of the ring gears 27 and 28 are swung about the axis 46 thereby moving the linkages 49 and 50 to adjust the valve connected to the pumps 21 and 22 thereby controlling the speed and direction of the motors 18 and 19.

To move the valves relative to each other the handle 45 is rotated, thereby moving the ring gear 27 in one direction and the ring gear 28 in the opposite direction moving the valve 21 in one direction and moving valve 22 in the other direction.

Thus, by moving handle 45 forward and rearward and by rotating it by handle 51, the speed, direction and steering can be controlled.

The foregoing specification sets forth the invention in its preferred, practical forms but the structure shown is capable of modification within a range of equivalents without department from the invention which is to be understood is broadly novel as is commensurate with the appended claims.

The embodiments of the invention in which an exclusive property or privilege is claimed are defined as follows:

1. A fork lift (10) comprising,
   a body,
   a first wheel (12) and a second wheel (13),
   a third caster wheel (14),
   said first wheel and said second wheel being independent of each other,
   a fork (15) on said body extending forwardly therefrom,
   a first hydraulic motor (18), a first torque hub (23) adapted to connect said first motor to said first wheel (12),
   a first hydraulic pump means (16) connected to said fork (15) for moving said fork up and down,
   a second hydraulic motor (19), a second torque hub (24) adapted to connect said second motor (19) to said second wheel (13),
   a third hydraulic motor connected to said fork (15),
   a first actuating means (49) connecting said first pump (21) to connect said first motor to said first wheel,
   a second actuating means connecting said second pump (22) to said second motor (19),
   said first actuating means comprising (a) first control means 27,49 connected to said first pump (21),
   said first control means 28,50 connected to said first pump 21, said first control means comprising a second sector of a ring gear swingably connected at its center to said body, and connected to said first valve, said second actuator means comprising,
   a first sector of a ring gear (27) swingably connected at its center to said body,
   a second sector of a ring gear (28) swingably connected at its center to said body in co-axial relation to said first sector of a ring gear and connected to said first valve,
   first teeth on said first sector of a ring gear extending towards said second sector of a ring gear,
   second teeth on said second sector of a ring gear extending towards said first sector of a ring gear and a handle swingably connected to the axis of rotation of said first and second sectors of ring gears,
   said handle being swingably connected to said body on an axis co-axial to said centers of said first and second sectors of ring gears and a sprocket on said handle, said sprocket having teeth engaging said first and second ring gear teeth, said handle being adapted to rotate said sprocket, whereby said first and second sectors of ring gears are rotated relative to each other and said first valve and said second valve are moved in opposite directions from each other, said handle being adapted to swing said first and second sectors of ring gears together thereby driving said first motor and said second motor selectively both in a first direction or in a second direction or driving said first and said second motors in opposite directions to each other for steering said fork lift.

2. The lift truck recited in claim 1 wherein said drive wheels each have a brake controlled by hydraulic pressure from said pump.

3. The lift truck recited in claim 2 wherein said brake is spring urged to closed position and is disengaged for hydraulic pressure from said pump.

4. The lift truck recited in claim 3 wherein said fork is actuated from hydraulic pressure from said motor means.

* * * * *